(12) United States Patent
DeWitt, III et al.

(10) Patent No.: US 7,518,071 B2
(45) Date of Patent: Apr. 14, 2009

(54) TURN SIGNAL SELF CANCELLATION SYSTEM

(75) Inventors: Thomas DeWitt, III, Madison, IN (US); Gary Dean Smith, Cross Plains, IN (US)

(73) Assignee: Grote Industries, Inc., Madison, IN (US)

(*) Notice: Subject to any disclaimer, the term of this patent is extended or adjusted under 35 U.S.C. 154(b) by 123 days.

(21) Appl. No.: 11/828,676

(22) Filed: Jul. 26, 2007

(65) Prior Publication Data

US 2009/0027186 A1  Jan. 29, 2009

(51) Int. Cl.
*H01H 3/16* (2006.01)

(52) U.S. Cl. .................... 200/61.27; 200/61.54
(58) Field of Classification Search .......... 200/61.27, 200/61.31–61.36, 61.54
See application file for complete search history.

(56) References Cited

U.S. PATENT DOCUMENTS

| | | | | |
|---|---|---|---|---|
| 3,914,566 A | * | 10/1975 | Wendling | 200/61.27 |
| 4,013,850 A | * | 3/1977 | Bull | 200/61.27 |
| 4,030,066 A | * | 6/1977 | White | 340/476 |
| 4,081,634 A | * | 3/1978 | Bull | 200/61.27 |
| 4,358,751 A | * | 11/1982 | Roudebush, Jr. | 340/477 |
| 4,638,290 A | * | 1/1987 | Wagner | 340/476 |
| 4,859,816 A | * | 8/1989 | Tanaka | 200/61.27 |
| 5,021,617 A | * | 6/1991 | DeShong | 200/61.27 |
| 5,313,028 A | * | 5/1994 | DuRocher | 200/61.27 |
| 5,385,067 A | * | 1/1995 | Wiersing et al. | 74/484 R |
| 5,575,177 A | * | 11/1996 | Poleschuk et al. | 74/484 R |
| 5,576,524 A | * | 11/1996 | Strom et al. | 200/61.27 |
| 5,646,384 A | * | 7/1997 | Noro et al. | 200/61.3 |
| 5,672,855 A | * | 9/1997 | Uchiyama et al. | 200/61.3 |
| 5,774,049 A | * | 6/1998 | Schreiner | 340/476 |
| 5,936,215 A | * | 8/1999 | Masuda et al. | 200/61.3 |
| 5,949,040 A | * | 9/1999 | Hayakawa et al. | 200/61.34 |
| 5,994,653 A | * | 11/1999 | Poleshuk et al. | 200/61.3 |
| 6,020,563 A | * | 2/2000 | Risk et al. | 200/61.54 |
| 6,025,564 A | * | 2/2000 | Verduci et al. | 200/61.27 |
| 6,204,759 B1 | * | 3/2001 | Jahnke | 340/476 |
| 6,225,582 B1 | * | 5/2001 | Stadler et al. | 200/61.27 |
| 6,396,011 B1 | * | 5/2002 | Glowczewski et al. | 200/61.54 |
| 6,414,593 B1 | * | 7/2002 | Conner et al. | 340/475 |
| 6,518,524 B1 | * | 2/2003 | Brandt et al. | 200/61.54 |
| 6,548,772 B2 | * | 4/2003 | Liburdi | 200/61.54 |
| 7,220,927 B2 | * | 5/2007 | Browne et al. | 200/61.27 |
| 7,332,684 B2 | * | 2/2008 | Tozuka et al. | 200/61.27 |

* cited by examiner

*Primary Examiner*—Michael A Friedhofer
*Assistant Examiner*—Lisa N Klaus
(74) *Attorney, Agent, or Firm*—Woodard, Emhardt, Moriarty, McNett & Henry LLP

(57) ABSTRACT

A motor vehicle turn signal cancelling device operated by a turn signal cancelling member projecting from the steering wheel includes a frame structure and a mounting member attached thereto. A fixture having a central portion positioned between oppositely extending first and second arms is pivotally mounted to the mounting member at the central portion to move the first and second arms into the path of movement of the cancelling member. The device further includes a turn signal activating lever pivotally mounted between its ends to the frame structure. A cancellation arm is pivotally mounted to the mounting member and defines a slot near its distal end. An engagement post associated with the lever is received in the slot defined in the cancellation arm. The engagement post and the slot are positioned between the pivotal axis of the turn signal activating lever and the pivotal axis of the cancellation arm.

27 Claims, 7 Drawing Sheets

TURN SIGNAL SELF CANCELLATION SYSTEM

FIELD OF THE INVENTION

The present disclosure relates to turn signal systems for motor vehicles, and more particularly to a turn signal self cancelling device.

BACKGROUND

Basic turn signal cancelling devices are generally known, and improvements to such devices may be found in patents such as U.S. Pat. No. 5,021,617 as an example. Typical turn signal cancelling devices are activated by turn signal cancelling members which are attached to the motor vehicle steering wheels. The turn signal cancelling member engages the turn signal cancelling device as the steering wheel is returned from the signaled turned position to a straight ahead position, to cancel the turn signal by returning the turn signal activating lever to the neutral, centered position.

In some turn signal cancelling devices, it is possible that extra space in the design of the device allows for components of the device to return to a position that is several degrees from centered. In such situations, the cancelling member on the steering wheel might continue contacting components of the device once cancellation has occurred and cause damage to the device and/or create objectionable noises to the driver and passengers in the motor vehicle.

Additionally, it occurs that sometimes a driver of the motor vehicle will hold the turn signal activating lever in the signaled direction of the turn even as the steering wheel returns from the signaled turned position to the straight ahead position or neutral position. This can cause damage to the turn signal cancelling device as the cancelling member associated with the steering wheel engages the device to cancel the turn signal because the driver is preventing the turn signal activating lever, and therefore the turn signal cancelling device, from moving to the neutral position under the force applied thereto by the steering wheel cancelling member.

There is therefore a need for an improved turn signal self cancellation system which provides for return of components of a turn signal cancellation device to their proper centered position to eliminate unwanted interference with the cancelling member. There is further a need for an improved turn signal self cancellation system which reduces the likelihood of damage to the turn signal cancellation device upon the driver holding the turn signal activating lever in the signaled direction. The present disclosure is directed toward devices which meet these needs.

SUMMARY

In certain embodiments, a motor vehicle turn signal device operated by a turn signal cancelling member depending from the steering wheel of the motor vehicle comprises a frame structure mounted to the vehicle steering column adjacent the steering wheel and a mounting member attached to the frame structure. Additionally, the device includes a fixture having a central portion positioned between oppositely extending first and second arms, the fixture being pivotally mounted to the mounting member at the central portion midway between the first and second arms to allow for pivotal movement in both clockwise and counter-clockwise directions. The pivotal movement allows the distal end of the second arm to move toward the path of movement of the cancelling member as the cancelling member moves with the steering wheel when the fixture is pivoted counter-clockwise, and allows the distal end of the first arm to move toward the path of movement of the cancelling member as the cancelling member moves with the steering wheel when the fixture is pivoted clockwise. The device further includes a turn signal activating lever positioned generally transversely of the first and second arms of the fixture. The turn signal activating lever is pivotally mounted between its ends to the frame structure for pivotal movement about a pivot axis parallel to and spaced from the pivot axis of the fixture in both clockwise and counter-clockwise directions. Additionally, the device includes a cancellation arm pivotally mounted to the mounting member at the proximal end of the cancellation arm to allow for pivotal movement in both clockwise and counter-clockwise directions about a pivot axis coincidental with the pivotal axis of the fixture. The proximal end of the cancellation arm overlaps the fixture midway between the first and second arms of the fixture, with the cancellation arm extending outwardly from the fixture generally transverse of the first and second arms of the fixture toward the proximal end of the turn signal activating lever. The cancellation arm defines a slot near its distal end. Further, the device includes an engagement post associated with the proximal end of the turn signal activating lever. The engagement post is received in the slot defined in the cancellation arm and is configured to travel in the slot. The engagement post and the slot are positioned between the pivotal axis of the turn signal activating lever and the pivotal axis of the cancellation arm, such that when the turn signal activating lever is pivoted in a counter-clockwise direction, the cancellation arm and fixture are caused to pivot in a clockwise direction, and when the turn signal activating lever is pivoted in a clockwise direction, the cancellation arm and fixture are caused to pivot in a counter-clockwise direction.

Additionally, in certain embodiments, a motor vehicle turn signal device operated by a turn signal cancelling member depending from the steering wheel of the motor vehicle comprises a support frame mounted to the vehicle steering column adjacent the steering wheel and a turn signal lever having a distal end and a proximal end, and extending along a longitudinal axis. The turn signal lever is pivotally associated with the frame between the distal end and the proximal end. The device also includes an engagement post associated with the turn signal lever and extending substantially perpendicular to the longitudinal axis. Additionally, the device includes a mounting post extending from the frame substantially perpendicular to the longitudinal axis. The device further includes a fixture having first and second opposing arms and defining a central bore configured to receive the mounting post, with the fixture being configured to pivot about the mounting post. The fixture includes first and second cancellation fingers extending from the first and second arms, respectively, for contacting the cancellation member. The device includes a cancellation arm having a proximal end and a distal end. The cancellation arm defines a bore adjacent the proximal end configured to receive the mounting post and an elongate slot adjacent the distal end configured to receive the engagement post. Additionally, the cancellation arm is configured to pivot about the mounting post, and the engagement post and the slot are configured to allow for at least slight travel of the engagement post in the slot.

Further, certain embodiments are directed to a turn signal system having a turn signal lever and a turn signal cancellation member. One of the lever and the cancellation member includes an engagement post extending therefrom and the other of the lever and the cancellation member defines an elongate slot configured to receive the engagement post. The engagement post and the slot are configured to allow for at
}

DESCRIPTION OF THE ILLUSTRATED EMBODIMENTS

Figure 1:
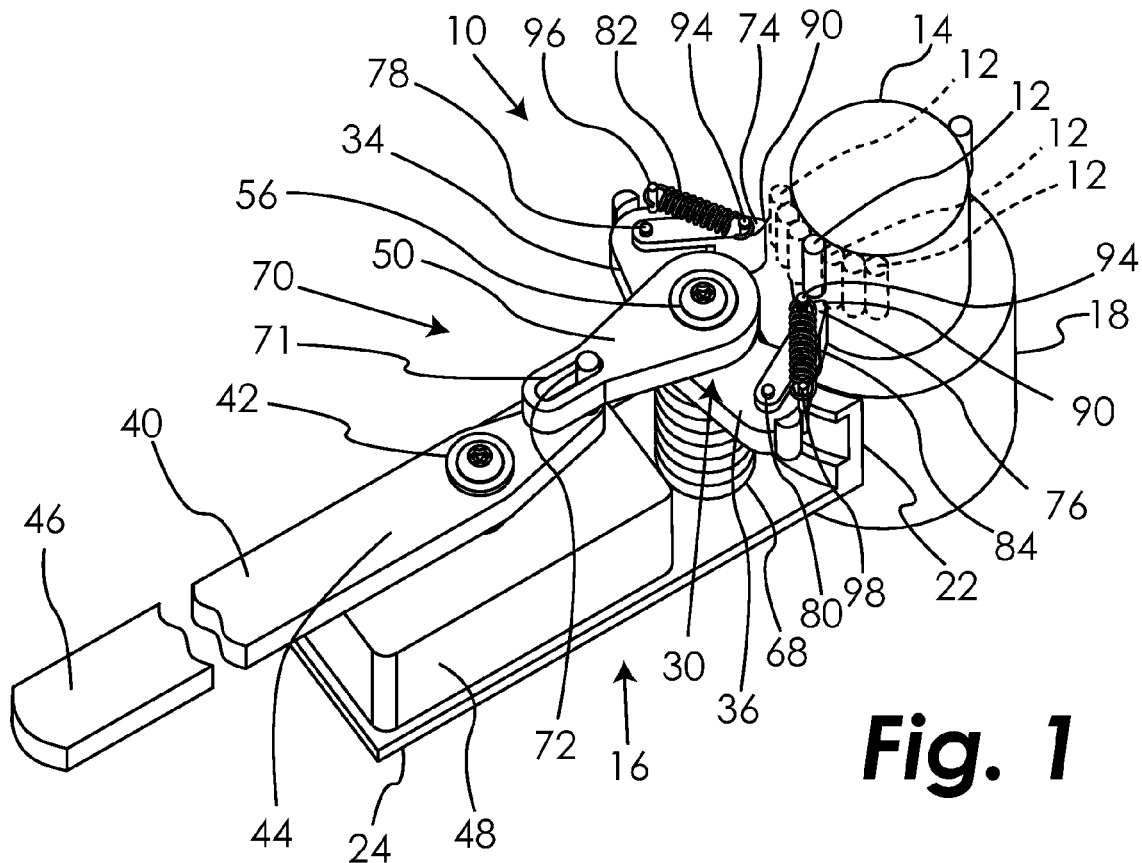
FIG. 1 is a perspective view of a turn signal cancelling device according to an embodiment of the present invention.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, and alterations and modifications in the illustrated systems, and further applications of the principles of the disclosure as illustrated therein are herein contemplated as would normally occur to one skilled in the art to which the disclosure relates.

Figure 2:
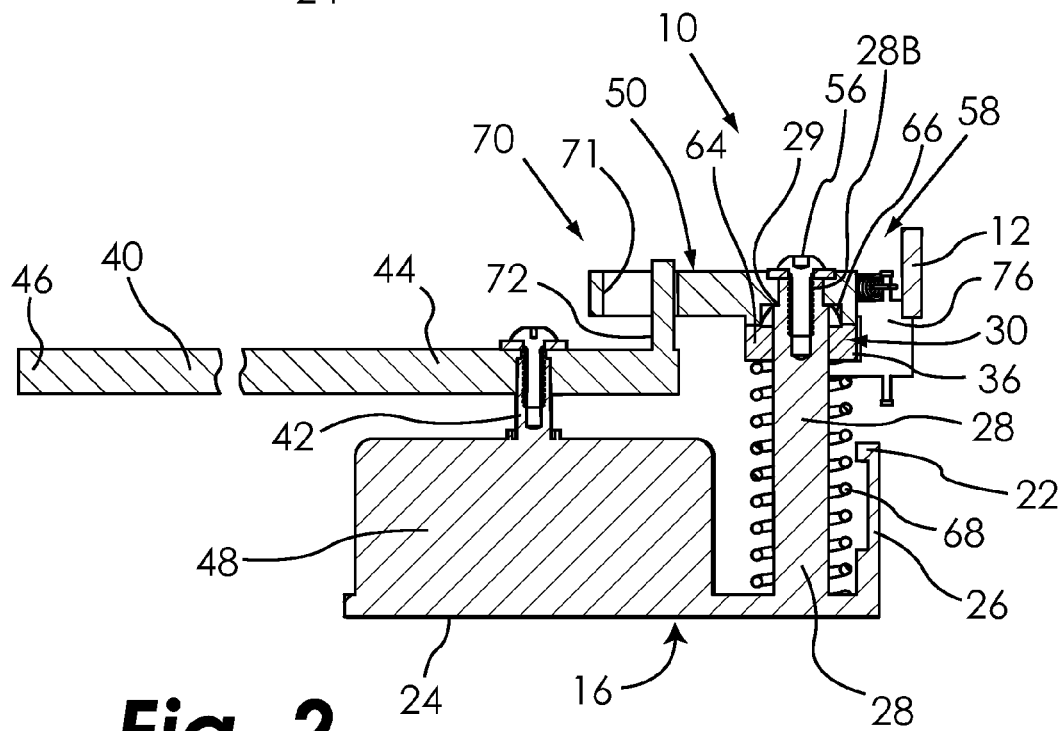
FIG. 2 is a side view, partially in cross-section of the turn signal cancelling device according to the embodiment shown in FIG. 1.
Figure 3:
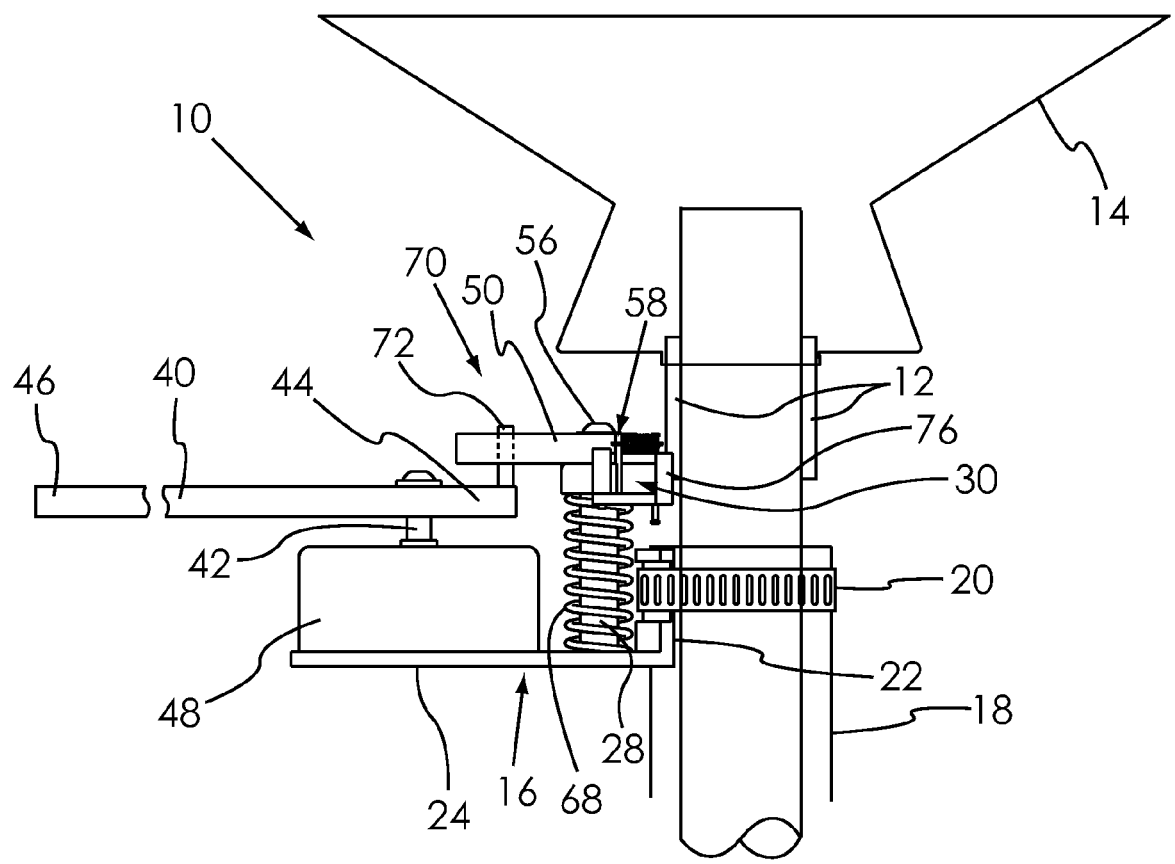
FIG. 3 is a side view of the turn signal cancelling device, according to the embodiment shown in FIG. 1, affixed to a motor vehicle steering column.

With reference to FIGS. 1, 2 and 3, there is shown a motor vehicle turn signal cancelling device, generally denoted as the numeral 10, activated by one or more turn signal cancelling members 12 projecting from a steering wheel 14 of a motor vehicle, such as a truck or automobile. The illustrated device 10 includes a single engagement post, associated with a turn signal activating lever, received in a slot defined in a cancellation arm. In preferred embodiments, movement of the activating lever causes movement of the cancellation arm via the post-in-slot arrangement, thereby forcing a component of the device into the path of the cancelling member to activate device 10 and cancel the vehicle's turn signal after the turn is made.

With continued reference to FIGS. 1, 2 and 3, the turn signal cancelling device 10 includes a frame structure 16 to which the other components of the cancelling device 10 are mounted, and which is used to attach the cancelling device 10 to a motor vehicle steering column 18 by attachment mechanism 20. The frame structure 16 is shown as being generally L-shaped in cross-section having a vertical flange 22 and a horizontal flange 24. However, it should be appreciated that frame structure 16 could be shaped differently, with the L-shaped illustration being only one example of numerous possible configurations.

In the illustrated embodiment, the attachment mechanism 20 is a circular clamp which circumscribes the steering column 18 of the motor vehicle and the vertical flange 22 includes a bracket 26 for engaging the circular clamp. Although a circular clamp is shown in the illustrated embodiment, other attachment mechanisms as would occur to one skilled in the art are contemplated by the present disclosure. A mounting member such as mounting post 28 is attached to the horizontal flange 24 of the frame structure 16 and extends upwardly therefrom. The post 28 may be formed with a circumferential step 29 so that the portion 28A of the post 28 beneath the step 29 has a larger circumference than the portion 28B of the post 28 above the step 29.

With reference to FIGS. 1-6, the device 10 also includes a fixture 30 having an upper surface, a lower surface, a central portion 32 and first and second arms 34 and 36, respectively, extending in opposite directions from the central portion 32. The fixture is mounted on the lower portion 28A of the post 28 beneath the step 29 and centered on the post 28 with the first arm 34 and second arm 36 extending generally perpendicular to the longitudinal axis of the post 28. The fixture 30 includes a mounting mechanism, generally denoted as the numeral 38, for mounting the fixture 30 on the post 28 for pivotable movement in both clockwise and counter-clockwise directions about a pivot axis coincidental with the longitudinal axis of the post 28, and also for movement on the post 28 in the longitudinal direction of the post 28. In the illustrated embodiment, mounting mechanism 38 includes a central bore 39 through the central portion 32 having a diameter substantially equal to the diameter of the post portion 28A beneath the step 29 for receiving the lower post portion 28A therethrough with a slip fit. However, it is contemplated that in other embodiments the fixture may be pivotally mounted on post 28 in other appropriate manners.

With reference to FIGS. 1 and 2, a turn signal activating lever 40 is also pivotably associated with the frame structure 16. The turn signal activating lever 40 has a pivot point 42 between its ends, with the pivot point 42 positioned closer to its first or proximal end 44 than to its second or distal end 46, with its pivot axis parallel to and spaced from the pivot axis of the fixture 30, i.e. parallel to the longitudinal axis of the post 28. Additionally, electrical switching mechanism 48 may be affixed to the horizontal flange 24 of the frame structure 16 adjacent to the post 28. The switching mechanism 48 is typically electrically associated with turn signal lamps of the motor vehicle. As illustrated, the turn signal activating lever 40 is pivotably attached to the electrical switching mechanism 48. When the turn signal activating lever 40 is pivoted counter-clockwise by the vehicle driver, it closes appropriate switches of the electrical switching means 40 to intermittently illuminate the motor vehicle's left-hand turn signal lamps, and when the turn signal activating lever 40 is pivoted clockwise by the vehicle driver, it closes appropriate switches of the electrical switching means 40 to intermittently illuminate the motor vehicle's right-hand turn signal lamps.

With reference to FIGS. 1-3, and 7-9, a cancellation arm 50 having a proximal end 50a and a distal end 50b overlaps the fixture 30 at proximal end 50a midway between the first arm 34 and second arm 36 of the fixture 30, and extends outwardly therefrom transversely to the first arm 34 and pivotal arm 36 of the fixture 30 toward the proximal end 44 of the turn signal activating lever 40. The cancellation arm 50 is pivotally mounted on post 28 for pivotal movement in both clockwise and counter-clockwise directions about a pivot axis coincidental with the pivotable axis of the fixture 30. Toward this objective, the cancellation arm 50 has a hub 52 at its proximal end 50a, and the hub 52 has a bore 54 therethrough having a diameter substantially equal to the diameter of the post portion 28B above the step 29 for receiving that portion of the upper post portion 28B therethrough with a slip fit. Accordingly, in the illustrated embodiment, the cancellation arm 50 is mounted on the post 28 above the fixture 30 with the underside of the cancellation arm 50 in abutment with the topside of the fixture 30. In certain embodiments, the cancellation arm 50 may be held on the post 28 by, for example, a screw 56 which is threadably received in a coaxial threaded bore in the distal end of the post 28, with the screw head in abutment with the top side of the hub 52 of the cancellation arm 50. Accordingly, the cancellation arm 50 is pivotally mounted on the post 28 for pivotal movement about a pivot axis coincidental with the pivotal axis of the fixture 30.

The fixture 30 and cancellation arm 50 may be operatively interconnected in certain embodiments by a clutch mechanism, generally denoted by the numeral 58. The clutch mechanism 58 provides for connecting the cancellation arm 50 to the fixture 30 for pivotal movement together about the coincidental pivot axis defined by the post 28, provides for relative pivotal movement of the fixture 30 to the cancellation arm 50 above a threshold breakaway torque applied to one of the other of the first arm 34 or second arm 36 of the fixture 30 by the cancelling member 12, and further provides for movement of the fixture 30 downwardly on the lower portion 28A of the post 28 away from the cancellation arm 50 in the longitudinal direction of the post 28 as will hereinafter be discussed. It is contemplated that the fixture 30 and the cancellation arm 50 may be interconnected in various other appropriate manners as would occur to one skilled in the art.

With reference to FIGS. 2-8, the clutch mechanism 58 comprises a first cam profile 60, formed in the central portion 32 of the fixture 30 interfacing with a mating second cam profile 62 formed in the hub 52 of the cancellation arm 50. The first and second cam profiles 60 and 62 may be wave-shaped, as illustrated, and concentrically disposed with bores 39 and 54, respectively. However, it is contemplated that the cam profiles could be shaped differently as would occur to one skilled in the art. In the illustrated embodiment, the first cam profile 60 comprises four teeth 64 having a triangular profile equally spaced apart from each other around the circumference of the central portion 32, and the second cam profile comprises four teeth 66 having an identical triangular profile equally spaced apart from each other around the circumference of the hub 52 of the cancellation arm 50. The teeth 64 and teeth 66 have, for example, a slope angle of 45 degrees. The teeth 64 of the first cam profile 60 intermesh with the teeth 66 of the second cam profile 64.

In certain embodiments, the clutch mechanism 58 also includes a biasing member 68 for resiliently biasing the fixture 30 upwardly toward the distal end of the post 28 and against the cancellation arm 50, forcing the first cam profile 60 of the central portion 32 of the fixture 30 against the second cam profile 62 of the hub 52 of the cancellation arm 50. In certain embodiments including the illustrated embodiment, the biasing member 68 may be a coil spring concentrically located over the post 28 with its bottom end in abutment with the horizontal flange 24 of the attachment mechanism 20 and with its top end in abutment with the underside of the fixture 30.

The turn signal activating lever 40 and the cancellation arm 50 include an interconnecting mechanism, generally denoted as the numeral 70, for interconnecting the proximal end 44 of the turn signal activating lever 40 and the distal end of the cancellation arm 50 at a location between the pivotal point 42 or pivotal axis of the turn signal activating lever 40 and the bore 54 or pivotal axis of the cancellation arm 50. Therefore, as the turn signal activating lever 40 is pivoted in a counter-clockwise direction for signaling a left-hand vehicle turn, the cancellation arm 50 and the fixture 30 are caused to pivot in a clockwise direction (see FIG. 14); and when the turn signal activating lever 40 is pivoted in a clockwise direction for signally a right-hand vehicle turn, the cancellation arm 50 and fixture 30 are caused to pivot in a counter-clockwise direction (see FIG. 13).

As illustrated, the interconnecting means 70 may include a single engagement post 72 located adjacent the proximal end 44 of the turn signal activating lever 40 received in an elongate slot 71 defined in the cancellation arm 50 near its distal end 50b. The elongate slot 71 includes a length generally parallel to a longitudinal axis of turn signal activating lever 40 and includes an opposite width. In the illustrated embodiment, the width of slot 71 is substantially equal to or slightly larger than the diameter of post 72, and the length dimension of slot 71 is at least twice the diameter of post 72 to allow for travel of post 72 in slot 71. When the turn signal activating lever 40 is pivoted in the counter-clockwise direction, the engagement post 72 pushes against an inside wall of the slot 71, pivoting the cancellation arm 50 and fixture 30 in the clockwise direction, and when the turn signal activating lever 40 is pivoted in the clockwise direction, engagement post 72 pushes against the other inside wall of the slot 71, pivoting the cancellation arm 50 and fixture 30 in the counter-clockwise direction.

Figure 15:
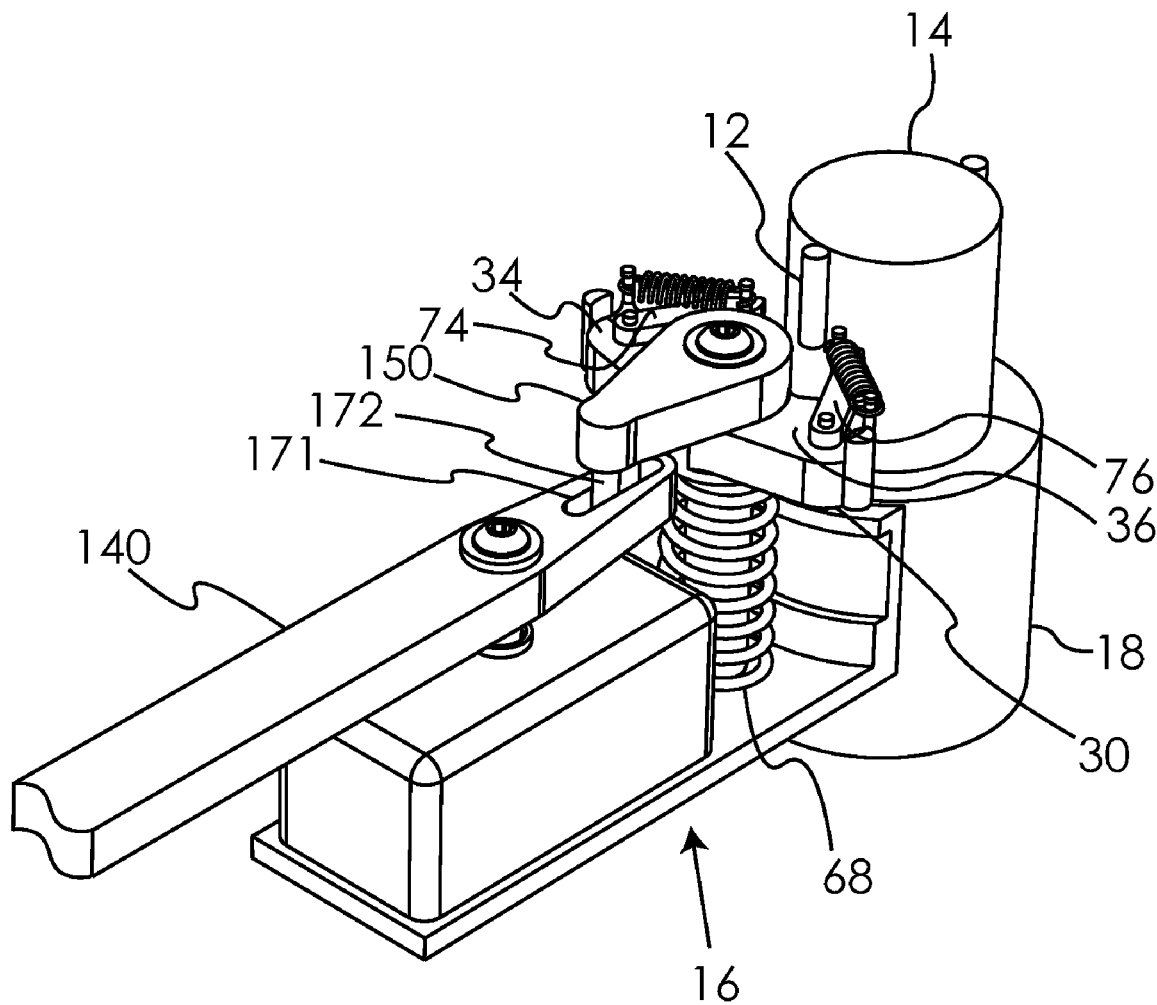
FIG. 15 is a perspective view of a turn signal cancelling device according to another embodiment of the present invention.

It should also be appreciated that a reverse of the engagement post-in-slot arrangement is contemplated, as illustrated in FIG. 15. In such embodiments, the engagement post, such as post 172, may be associated with and extend down from cancellation arm 150, with turn signal activating lever 140 defining a slot therein, such as slot 171. Slot 171 is configured to receive engagement post 172 and allow for movement of the post within the slot, substantially as described herein with reference to movement of post 72 in slot 71.

Figure 4:
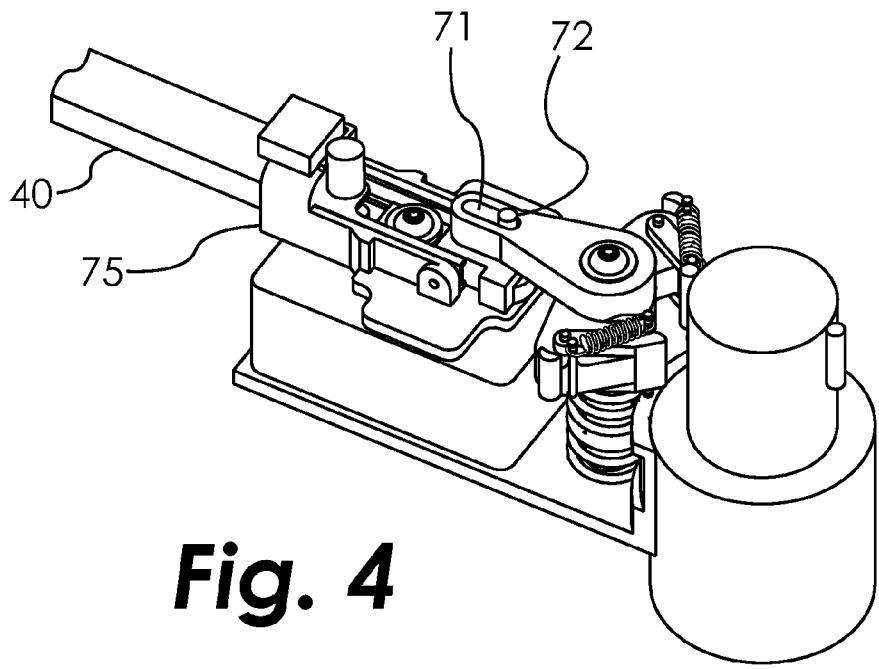
FIG. 4 is a perspective view of a turn signal cancelling device according to another embodiment of the present invention.

In certain embodiments, as illustrated in FIG. 4, device 10 may optionally include a retainer member 75. Retainer member 75 may be attached to turn signal activating lever 40 in various appropriate manners, such that member 75 pivots along with lever 40. As illustrated, member 75 is attached to turn signal activating lever 40 near the proximal end of the lever and extends up from the lever toward cancellation arm 50. In embodiments including retainer member 75, engagement post 72 is attached to and extends from the member 75 near its proximal end, and is received in the slot 71 defined in the cancellation arm 50. In some embodiments, retainer member 75 may be included to allow turn signal activating lever 40 to pivot forward and backward to activate high beam lights, in a plane substantially perpendicular to the plane of pivoting to activate the turn signals. In other embodiments, retainer member 75 may be included to allow for rotational pivoting of turn signal activating lever 40 about a longitudinal axis of the lever to activate various possible vehicle controls, including cruise control features and windshield wiper blade settings as examples.

With reference to FIGS. 1, 2, 3, 10, 11 and 12, the cancelling device 10 may optionally include a first cancelling member engagement finger 74 and a second cancelling member engagement finger 76. In such embodiments, the first cancelling member engagement finger 74 is pivotally mounted at its proximal end to the distal end of the first arm 34 of the fixture 30 and projects generally transversely outwardly from the first arm 34. The second cancelling member engagement finger 76 may be pivotally mounted at its proximal end to the distal end of the second arm 36 of the fixture 30 and project generally transversely outwardly from the second arm 36. In certain embodiments, the proximal end of the first cancelling member engagement finger 74 may be pivotally connected to the first arm 34 by a pivot pin 78 parallel to the post 28 defining the pivot axis of the fixture 30 for pivotal movement in both clockwise and counter-clockwise directions about the pivot axis or pin 78 generally in the plane of the fixture 30. Additionally, the proximal end of the second cancelling member engagement finger 76 may be pivotally connected to the second arm 36 by a pivot pin 80 parallel to the post 28 defining the pivot axis of the fixture 30 for pivotal movement in both clockwise and counter-clockwise directions about the pivot axis or pin 80 generally in the plane of the fixture 30.

In the illustrated embodiment, the first cancelling member engagement finger 74 is resiliently biased to pivot in a counter-clockwise direction by a spring 82 which is connected at one of its ends to the distal end of the first arm 34 and at its other end to the first cancelling member engagement finger 74 between the proximal and distal ends of the first cancelling member engagement finger 74. Additionally, in the illustrated embodiment, the second cancelling member engagement finger 76 is resiliently biased to pivot in a clockwise direction by a spring 84 which is connected at one of its ends to the distal end of the second arm 36 and at its other end to the second cancelling member engagement finger 76 between the proximal and distal ends of the second cancelling engagement finger 76.

As illustrated, the first and second cancelling member engagement fingers 74 and 76 may be identical to each other. In certain embodiments, the cancelling member engagement fingers 74 and 76 each include two parallel spaced apart flanges 86 and 88 and an end or tip 90 interconnecting the flanges 86, 88 at the distal end of the cancelling member engagement finger. Additionally, the flanges 86 and 88 may include aligned apertures 92 at their ends opposite the tip 90 for receiving the pivot pins 78, 80 for pivotally mounting the cancelling member engagement fingers 74 and 76, respectively, to the first and second arms 34 and 36 of the fixture 30, as discussed above. As illustrated, the distal ends of the first and second arms are received in the spaces between the flanges.

In the illustrated embodiment, the pivotal movement of the first and second cancelling member engagement fingers 74 and 76 is limited in both clockwise and counter-clockwise directions by the tips 90 which contact the lateral sides of the first and second arms 34 and 36 at the opposite extremes of pivotal motion of the cancelling member engagement fingers 74 and 76. The cancelling member engagement fingers 74 and 76 may also include two spring-retaining posts 94 extending outwardly from each flange 86 and 88 at a location between the proximal and distal ends of the cancelling engagement fingers for attaching one end of the springs 82 and 84 to the cancelling engagement fingers. Thus, in certain embodiments, the cancelling member engagement finger is symmetrical so that it may be used as both the first finger 74 and second finger 76.

Figure 5:
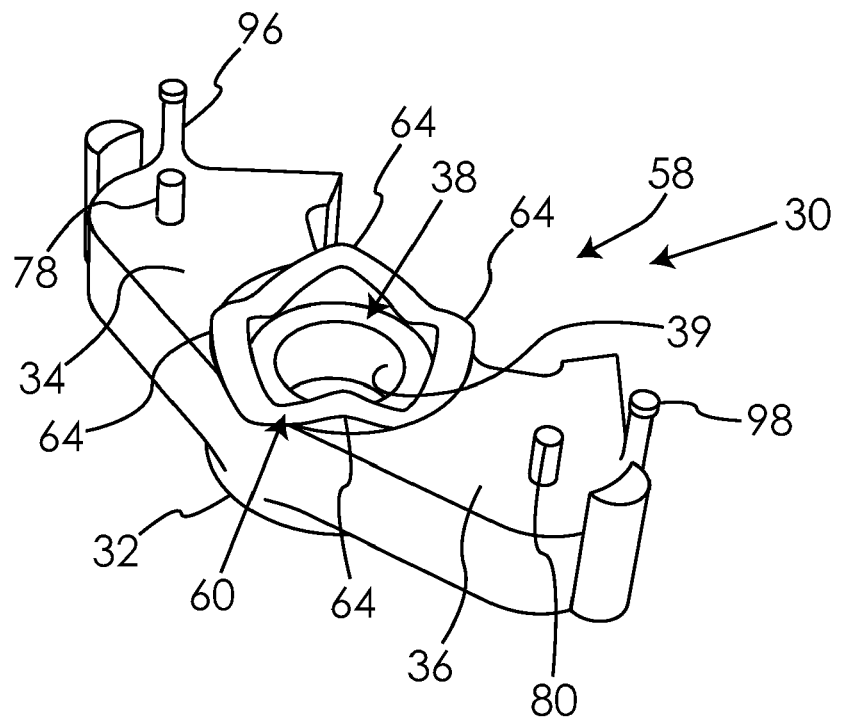
FIG. 5 is a perspective view of a component of the turn signal cancelling device according to the embodiment shown in FIG. 1.
Figure 6:
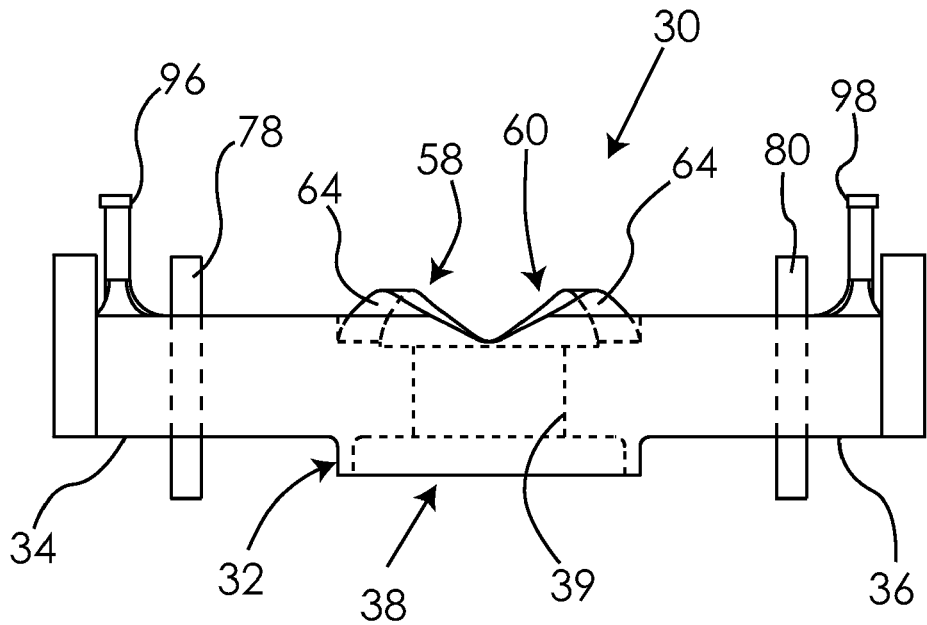
FIG. 6 is a side view of the component illustrated in FIG. 5.
Figure 7:
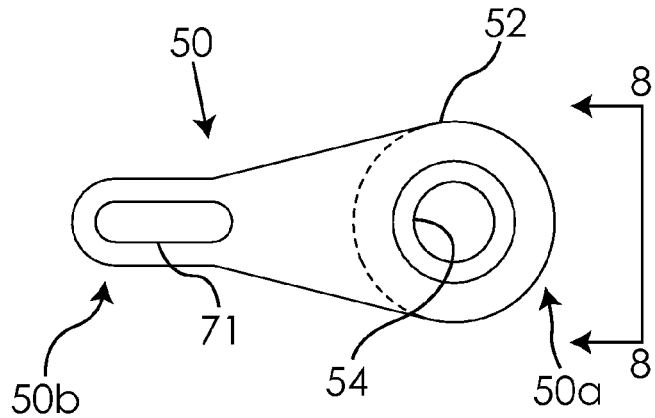
FIG. 7 is a top view of another component of the turn signal cancelling device according to the embodiment shown in FIG. 1.
Figure 8:
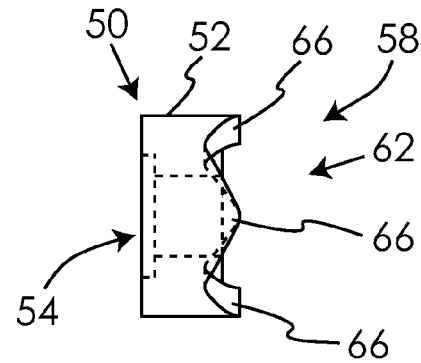
FIG. 8 is a side view of the component illustrated in FIG. 7 as seen in the direction of arrows 8-8 in FIG. 7.
Figure 9:
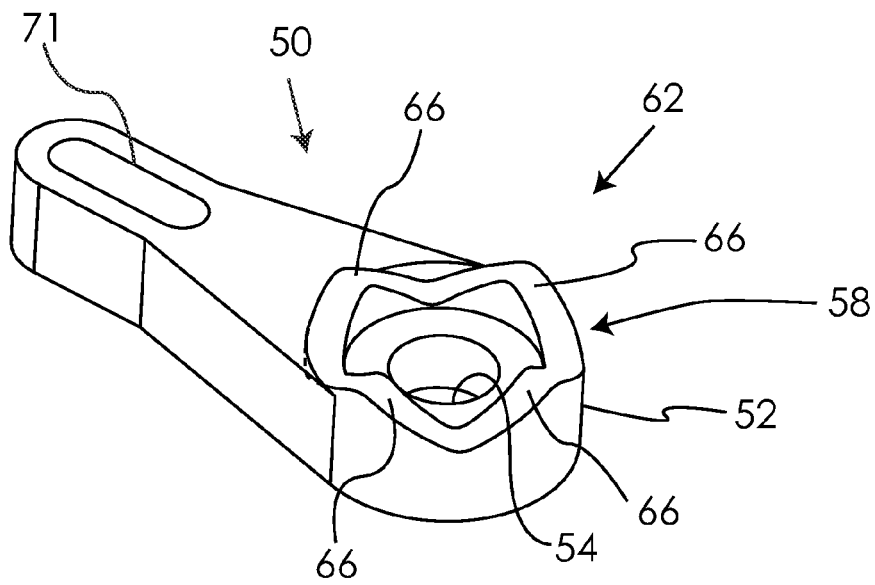
FIG. 9 is a perspective view of the component illustrated in FIG. 7.
Figure 10:
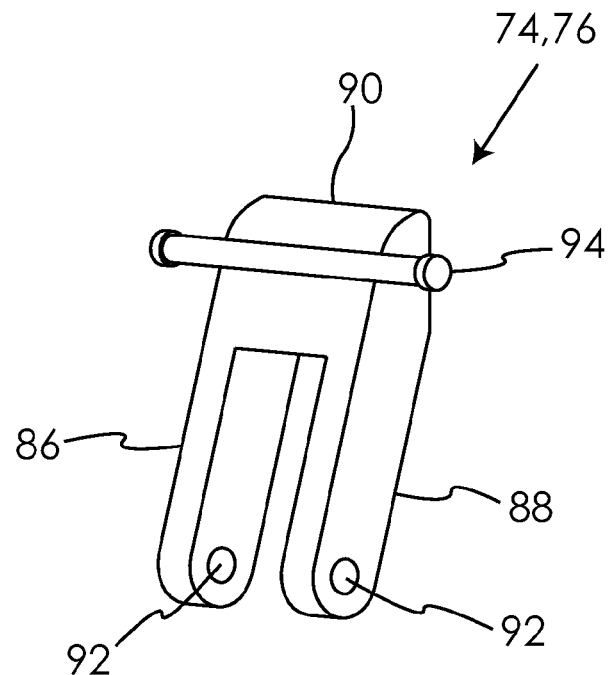
FIG. 10 is a perspective view of still another component of the turn signal cancelling device according to the embodiment shown in FIG. 1.
Figure 11:
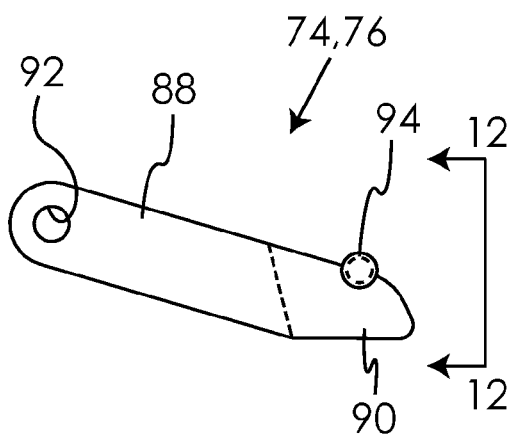
FIG. 11 is a top view of the component illustrated in FIG. 10.
Figure 12:
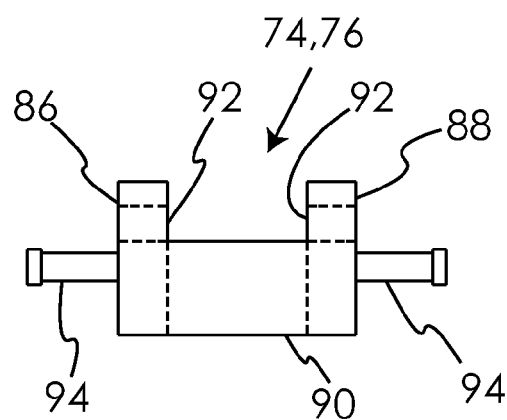
FIG. 12 is an end view of the component of FIG. 10 as seen in the direction of the arrows 12-12 in FIG. 11.

With reference to FIGS. 1, 5 and 6, the fixture 30 may include a first spring retaining post 96 for attaching the opposite end of the spring 82 to distal end of the first arm 34 and a second spring retaining post 98 for attaching the opposite end of the spring 84 to the distal end of the second arm 36. In the illustrated embodiment, the first spring retaining post projects perpendicularly outwardly from the first arm 34 near the distal end of the first arm 34 spaced from the pivot pin 78, pivotally attaching the first cancelling member engagement finger 74 to the first arm 34. Similarly, the second spring retaining post 98 projects perpendicularly outwardly from the second arm 36 near the distal end of the second arm 36 spaced from the pivot pin 80, pivotally attaching the second cancelling member engagement finger 76 to the second arm 36.

The operation of the cancelling device 10 will now be discussed with reference to FIGS. 1, 13 and 14. FIG. 1 illustrates the cancelling device 10 in the neutral position wherein neither a right turn nor left turn is being signaled. In the neutral position, the cancelling member 12 on the motor vehicle steering wheel 14 misses, i.e. bypasses first and second cancelling member engagement fingers 74 and 76 as the steering wheel is turned. The movement of the cancelling member 12 is indicated by the cancelling member 12 illustrated in phantom.

Figure 13:
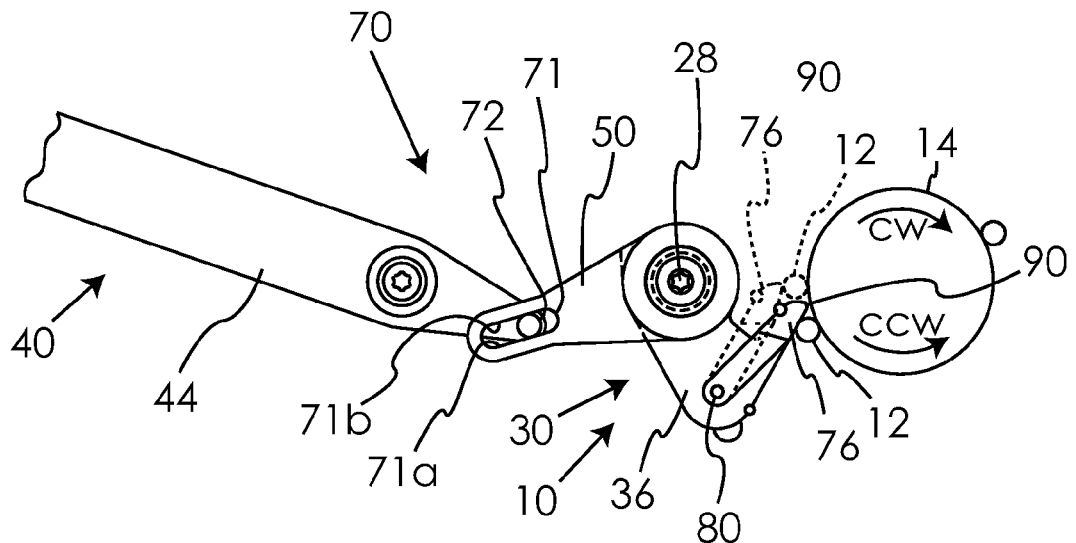
FIG. 13 is a top view of the turn signal cancelling device according to the embodiment shown in FIG. 1, showing it in a right-hand turn position.

FIG. 13 illustrates the cancelling device 10 in a right-hand turn indicating position when the vehicle driver moves the turn signal activating lever 40 from the neutral or straight ahead position clockwise to signal a right-hand turn. As the turn signal activating lever 40 is pivoted clockwise about its pivot point 42 by the vehicle driver, the engagement post 72 is forced against longitudinal side 71a of slot 71 defined in the cancellation arm 50, pivoting the cancellation arm 50 and, therefore, the fixture 30 about the pivot axis defined by the post 28 in a counter-clockwise direction, thereby moving the first arm 34 and its attached first cancelling member engagement finger 74 away from the circular path of the cancelling member 12 and moving the second arm 36 and its attached second cancelling member engagement finger 76 toward the circular path of the cancelling member 12. As the cancelling member 12 moves clockwise with the vehicle steering wheel 14 to turn the vehicle in a right-hand turn (indicated by the arrow "CW"), the cancelling member 12 contacts one side of the distal end of the second cancelling member engagement finger 76 and causes it to pivot against the bias of the spring 84 counter-clockwise about its pivot pin 80 (as indicated by the phantom lines) allowing the cancelling member 12 to freely bypass the second cancelling member engagement finger 76 so that the cancelling device 10 will not interfere with the turning of the steering wheel 14 and will not cancel the turn signal. The biasing spring 84 returns the second cancelling member engagement finger 76 back in a clockwise direction about its pivot pin 80 and into abutment with the distal end of the second arm 36 as the cancelling member 12 passes the second cancelling member engagement finger 76.

Under typical operating driving conditions, the vehicle driver releases his hold on the turn signal activating lever 40, and as the vehicle steering wheel 14 is returned counter-clockwise back to the neutral or straight ahead position (indicated by the arrow "CCW") the cancelling member 12 contacts the other side of the distal end of the second cancelling member engagement finger 76 which is now in abutment with the distal end of the second finger 36 due to the bias force of the spring 84 forcing the fixture 30 and, therefore, the cancellation arm 50 to pivot about the pivot axis defined by the post 28 in a clockwise direction back to the neutral position shown in FIG. 1, cancelling the turn signal. In such embodiments, the cancellation arm 50 is returned to a substantially centered position, reducing the likelihood that either of the engagement fingers will interfere with the cancelling member 12 and/or remain even slightly positioned in the path of the cancelling member. As the cancellation arm 50 pivots in the clockwise direction back to the neutral position, the same longitudinal side 71*a* of slot 71 is forced back against the engagement post 72, causing the turn signal activating lever 40 to pivot counter-clockwise about its pivot point 42 back to the neutral or straight ahead position.

However, it sometimes occurs that the vehicle driver does not release hold of the turn signal activating lever 40 as the vehicle steering wheel 14 is returned counter-clockwise back to the neutral or straight ahead position after a right-hand turn is completed. In this event, when the vehicle steering wheel 14 is returned counter-clockwise back to the neutral or straight ahead position, the cancelling member 12 contacts the other side of the distal end of the second cancelling member engagement finger 76, which is now in abutment with the distal end of the second arm 36 due to the bias force of the spring 84, however, the fixture 30 and, therefore, the cancellation arm 50 cannot pivot about the pivot axis defined by the post 28 as it could under proper operating driving conditions because the driver is holding the turn signal activating lever 40. When this happens, the cancelling member 12 moving counter-clockwise with the steering wheel 14 continues to apply a force against the second cancelling member engagement finger 76 and, therefore, the second arm 36 of the fixture 30 being held against rotation about the post 28 until the force generated by the cancelling member 12 exceeds the threshold torque of clutch mechanism 58.

In certain embodiments, as the threshold torque of the clutch mechanism 58 is exceeded, the clutch mechanism 58 slips allowing relative pivotal movement of the fixture 30 about the post 28 in a clockwise direction relative to the still stationary cancellation arm 50 being held against pivotal movement about the post 28 by the turn signal activating lever 40. As the fixture 30 pivots about the post 28, the first cam profile 60 on the central portion 32 of the fixture 30 may ride over the second cam profile 62 on the hub 52 of the cancellation arm 50. As the first cam profile 60 rides over the second cam profile 62, the teeth 64 of the first cam profile 60 are moved out of meshing engagement with the teeth 66 of the second cam profile 62 and slides on the edges of the teeth 66 of the second cam profile 62, thereby forcing the fixture 30 downwardly along the longitudinal axis of the post 28 against the biasing force of the spring 68. Accordingly, the fixture 30 is moved away from the cancellation arm 50 until the second cancelling member engagement finger 76 is displaced beneath the distal end of the depending cancelling member 12 allowing the cancelling member 12 to move over the top side of and pass the second cancelling member engagement finger 76, thereby preventing potential damage to the second cancelling member engagement finger 76 and fixture 30.

Figure 14:
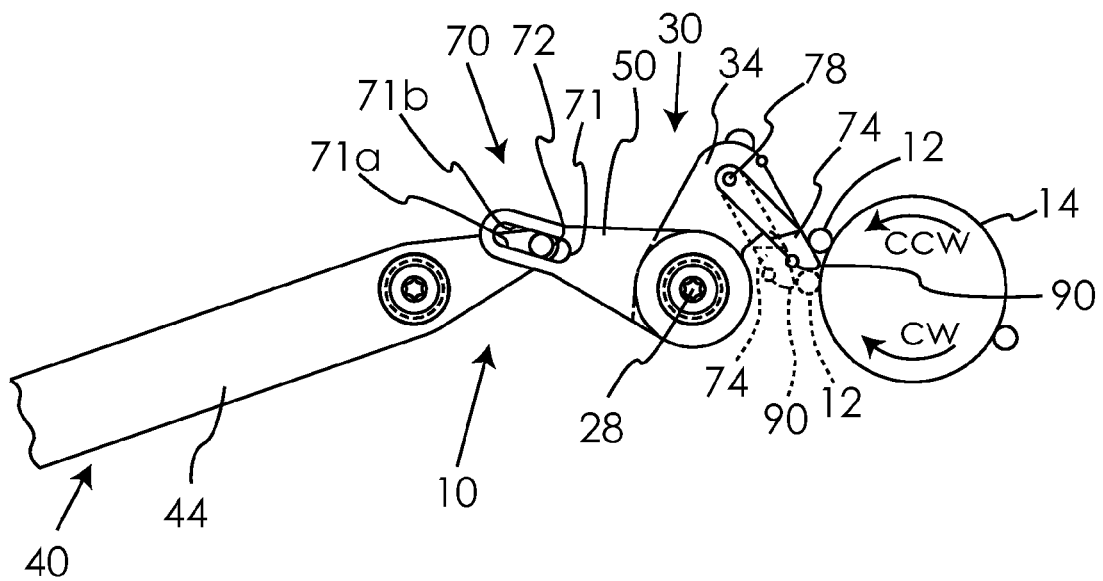
FIG. 14 is a top view of the turn signal cancelling device according to the embodiment shown in FIG. 1, showing it in a left-hand turn position.

FIG. 14 illustrates the cancelling device 10 in a left-hand turn position when the vehicle driver moves the turn signal activating lever 40 from the neutral position or straight ahead position counter-clockwise to signal a left-hand turn. As the turn signal activating lever 40 pivots counter-clockwise about its pivot point 42, the engagement post 72 is forced against longitudinal side 71*b* of slot 71 of the cancellation arm 50, thereby pivoting the cancellation arm 50 and, therefore, the fixture 30 about the pivot axis defined by the post 28 in a clockwise direction, moving the first arm 34 and its attached first cancelling member engagement finger 74 toward the circular path of the cancelling member 12 and moving the second arm 36 and its attached second cancelling member engagement finger 76 away from the circular path of the cancelling member 12. As the cancelling member 12 moves counter-clockwise with the vehicle steering wheel 14 to turn the vehicle in a left-hand turn (indicated by the arrow "CCW"), the cancelling member 12 contacts one side of the distal end of the first cancelling member finger 74 and causes it to pivot against the bias of the spring 82 clockwise about its pivot pin 78 (as indicated by the phantom lines), allowing the cancelling member 12 to freely bypass the first cancelling member engagement finger 74 so that the cancelling device 10 will not interfere with the turning of the steering wheel 14 and will not cancel the turn signal. The biasing spring 82 returns the first cancelling member engagement finger 74 back in a counter-clockwise direction about its pivot pin 78 and into abutment with the distal end of the first arm 34 as the cancelling member 12 passes the first cancelling member engagement finger 74.

Under typical operating driving conditions, the vehicle driver releases his hold on the turn signal activating lever 40, and as the vehicle steering wheel 14 is returned clockwise back to the neutral or straight ahead position (indicated by the arrow "CW"), the cancelling member 12 contacts the other side of the distal end of the first cancelling member engagement finger 74 which is now in abutment with the distal end of the first finger 34 due to the bias force of the spring 82 forcing the fixture 30 and, therefore, the cancellation arm 50 to pivot about the pivot axis defined by the post 28 in a counter-clockwise direction back to the neutral position shown in FIG. 1, cancelling the turn signal. In such embodiments, the cancellation arm 50 is returned to a substantially centered position, reducing the likelihood that either of the engagement fingers will interfere with the cancelling member 12 and/or remain even slightly positioned in the path of the cancelling member. As the cancellation arm 50 pivots in the counter-clockwise direction back to the neutral position, the same longitudinal side 71*b* of slot 71 of the cancellation arm 50 is forced back against the engagement post 72, causing the turn signal activating lever 40 to pivot clockwise about its pivot point 42 back to the neutral or straight ahead position.

However, it sometimes occurs that the vehicle driver does not release hold of the turn signal activating lever 40 as the vehicle steering wheel 14 is returned clockwise back to the neutral or straight ahead position after a left-hand turn is completed. In this event, when the vehicle steering wheel 14 is returned clockwise back to the neutral or straight ahead position, the cancelling member 12 contacts the other side of the distal end of the first cancelling member engagement finger 74, which is now in abutment with the distal end of the first arm 34 due to the bias force of the spring 82, however, the fixture 30 and, therefore, the cancellation arm 50 cannot pivot about the pivot axis defined by the post 28 as it could under proper operating driving conditions because the driver is holding the turn signal activating lever 40. When this happens, the cancelling member 12 moving clockwise with the turning wheel 14 continues to apply a force against the first cancelling member engagement finger 74 and, therefore, the first arm 34 of the fixture 30 being held against rotation about the post 28 until the force generated by the cancelling member 12 exceeds the threshold torque of clutch mechanism 58.

In certain embodiments, as the threshold torque of the clutch mechanism 58 is exceeded, the clutch mechanism 58 slips allowing relative pivotal movement of the fixture 30 about the post 28 in a counter-clockwise direction relative to the still-stationary cancellation arm 50 being held against pivotal movement about the post 28 by the turn signal activating lever 40. As the fixture 30 pivots about the post 28, the first cam profile 60 on the central portion 32 of the fixture 30 may ride over the second cam profile 62 on the hub 52 of the cancellation arm 50. As the first cam profile 60 rides over the second cam profile 62, the teeth 64 of the first cam profile 60 are moved out of meshing engagement with the teeth 66 of the second cam profile 62 and slides on the edges of the teeth 66 of the second cam profile 62, thereby forcing the fixture 30 downwardly along the longitudinal axis of the post 28 against the biasing force of the spring 68. Accordingly, the fixture 30 is moved away from the cancellation arm 50 until the first cancelling member engagement finger 74 is displaced beneath the distal end of the depending cancelling member 12 allowing the cancelling member 12 to move over the top side of and pass the first cancelling member engagement finger 74, thereby preventing potential damage to the first cancelling member engagement finger 74 and fixture 30.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A motor vehicle turn signal device operated by a turn signal cancelling member depending from the steering wheel of the motor vehicle comprising:
    a frame structure mounted to the vehicle steering column adjacent the steering wheel;
    a mounting member attached to the frame structure;
    a fixture having a central portion positioned between oppositely extending first and second arms, wherein the fixture is pivotally mounted to the mounting member at the central portion midway between the first and second arms to allow for pivotal movement in both clockwise and counter-clockwise directions to move the distal end of the second arm toward the path of movement of the cancelling member as the cancelling member moves with the steering wheel when the fixture is pivoted counter-clockwise, and to move the distal end of the first arm toward the path of movement of the cancelling member as the cancelling member moves with the steering wheel when the fixture is pivoted clockwise;
    a turn signal activating lever positioned generally transversely of the first and second arms of the fixture, wherein the turn signal activating lever is pivotally mounted between its ends to the frame structure for pivotal movement about a pivot axis parallel to and spaced from the pivot axis of the fixture in both clockwise and counter-clockwise directions;
    a cancellation arm pivotally mounted to the mounting member at the proximal end of the cancellation arm to allow for pivotal movement in both clockwise and counter-clockwise directions about a pivot axis coincidental with the pivot axis of the fixture, wherein the proximal end of the cancellation arm overlaps the fixture midway between the first and second arms of the fixture, wherein the cancellation arm extends outwardly from the fixture generally transverse of the first and second arms of the fixture toward the proximal end of the turn signal activating lever, wherein the cancellation arm defines a slot near its distal end; and
    an engagement post associated with the proximal end of the turn signal activating lever, wherein the engagement post is received in the slot defined in the cancellation arm and is configured to travel in the slot, wherein the engagement post and the slot are positioned between the pivotal axis of the turn signal activating lever and the pivotal axis of the cancellation arm such that when the turn signal activating lever is pivoted in a counter-clockwise direction, the cancellation arm and fixture are caused to pivot in a clockwise direction, and when the turn signal activating lever is pivoted in a clockwise direction, the cancellation arm and fixture are caused to pivot in a counter-clockwise direction.

2. The device of claim 1, wherein the fixture includes an upper surface facing the cancellation arm and an opposite lower surface, the upper surface having a first cam profile formed therein, wherein the cancellation arm includes a lower surface facing the fixture and an opposite upper surface, the lower surface having a second cam profile formed therein adjacent the proximal end of the cancellation arm, wherein the first and second cam profiles interconnect the cancellation arm and the fixture, providing for pivotal movement of the fixture together with pivotal movement of the cancellation arm about the coincidental pivot axis, and providing for pivotal movement of the fixture relative to the cancellation arm about the coincidental pivot axis above a threshold torque applied to the first and second arms of the fixture by the cancelling member.

3. The device of claim 2, wherein the first and second cam profiles further provide for moving the fixture away from the cancellation arm in the longitudinal direction of the coincidental pivot axis above the threshold torque applied to the first and second arms of the fixture by the cancelling member.

4. The device of claim 2, comprising a biasing member for forcing the first and second cam profiles of the fixture and cancellation arm together, and forcing the fixture toward the cancellation arm in the longitudinal direction of the coincidental pivot axis of the cancellation arm and fixture.

5. The device of claim 1, comprising:
    a first cancelling member engagement finger pivotally mounted to the first arm of the fixture, adjacent the distal end of the first arm, for pivotal movement in both clockwise and counter-clockwise directions relative to the first arm; and
    a second cancelling member engagement finger pivotally mounted to the second arm of the fixture, adjacent the distal end of the second arm, for pivotal movement in both clockwise and counter-clockwise directions relative to the second arm.

6. The device of claim 5, wherein the first cancelling member engagement finger is biased in a counter-clockwise direction and the second cancelling member engagement finger is biased in a clockwise direction.

7. The device of claim 5, wherein the pivotal axes of the fixture and the first and second cancelling member engagement fingers are parallel.

8. The device of claim 1, wherein the mounting member is a post extending from the frame structure, wherein the fixture defines a bore at the central portion of the fixture midway between the first and second arms and the cancellation arm defines a bore adjacent the proximal end of the cancellation arm, the bores receiving the post with a slip fit.

9. The device of claim 8, wherein the first and second cam profiles are concentrically disposed with the bore of the fixture and the bore of the cancellation arm, respectively, whereby, when the first and second cam profiles move out of mutual mating relationship, the fixture is forced away from the cancellation arm in the direction along the longitudinal axis of the post.

10. The device of claim 1, comprising a retainer member attached to the turn signal activating lever adjacent the proximal end of the lever, wherein the engagement post is attached to the retainer member.

11. The device of claim 1, wherein the slot defined in the cancellation arm includes a length and a width, the width being slightly larger than the diameter of the engagement post and the length being at least twice the diameter of the engagement post to allow for travel of the engagement post in the slot.

12. A motor vehicle turn signal device operated by a turn signal cancelling member depending from the steering wheel of the motor vehicle comprising:
 a support frame mounted to the vehicle steering column adjacent the steering wheel;
 a turn signal lever having a distal end and a proximal end, and extending along a longitudinal axis, the lever being pivotally associated with the frame between the distal end and the proximal end;
 an engagement post associated with the turn signal lever and extending substantially perpendicular to the longitudinal axis;
 a mounting post extending from the frame substantially perpendicular to the longitudinal axis;
 a fixture having first and second opposing arms and defining a central bore configured to receive the mounting post, wherein the fixture is configured to pivot about the mounting post, wherein the fixture includes first and second cancellation fingers extending from the first and second arms, respectively, for contacting the cancellation member; and
 a cancellation arm having a proximal end and a distal end, wherein the cancellation arm defines a bore adjacent the proximal end configured to receive the mounting post and an elongate slot adjacent the distal end configured to receive the engagement post, wherein the cancellation arm is configured to pivot about the mounting post, wherein the engagement post and the slot are configured to allow for at least slight travel of the engagement post in the slot.

13. The device of claim 12, wherein the fixture includes an upper surface facing the cancellation arm and an opposite lower surface, the upper surface having a first cam profile formed therein about the bore, wherein the cancellation arm includes a lower surface facing the fixture and an opposite upper surface, the lower surface having a second cam profile formed therein adjacent the proximal end of the cancellation arm about the bore, wherein the first and second cam profiles having mating configurations and interconnect the cancellation arm and the fixture, providing for synchronized pivotal movement of the fixture and the cancellation arm, and providing for pivotal movement of the fixture relative to the cancellation arm above a threshold torque applied to the first and second cancellation fingers of the fixture by the cancelling member.

14. The device of claim 13, wherein the first and second cam profiles are wave-shaped profiles.

15. The device of claim 13, comprising a biasing member positioned between the frame and the lower surface of the fixture for forcing the first and second cam profiles of the fixture and cancellation arm together.

16. The device of claim 12, wherein the first and second cancellation fingers are pivotally mounted to the first and second arms of the fixture, respectively.

17. The device of claim 16, wherein the first cancelling finger is biased in a counter-clockwise direction and the second cancelling finger is biased in a clockwise direction.

18. The device of claim 12, wherein the bores of the fixture and the cancellation arm are configured to receive the mounting post with a slip fit.

19. The device of claim 12, comprising a retainer member attached to the turn signal activating lever adjacent the proximal end of the lever, wherein the engagement post extends from the retainer member.

20. The device of claim 12, wherein the elongate slot defined in the cancellation arm includes a length and a width, the width being slightly larger than the diameter of the engagement post and the length being at least twice the diameter of the engagement post to allow for travel of the engagement post in the slot.

21. A turn signal system, comprising:
 a turn signal lever;
 a turn signal cancellation member; and
 an engagement post extending from one of the lever and the cancellation member; and
 an elongate slot formed in the other of the lever and the cancellation member, the elongate slot being configured to receive the engagement post, wherein the engagement post and the slot are configured to allow for at least slight travel of the engagement post in the slot upon activation of the turn signal system.

22. The system of claim 21, wherein the engagement post extends from the turn signal lever and the slot is formed in the turn signal cancellation member.

23. The system of claim 21, wherein the engagement post extends from the turn signal cancellation member and the slot is formed in the turn signal lever.

24. The system of claim 21, comprising a mounting post extending from a support frame mounted to a vehicle steering column, wherein the turn signal cancellation member defines a bore configured to receive the mounting post and is configured to pivot about the mounting post.

25. The system of claim 24, comprising a fixture having first and second opposing arms and defining a central bore configured to receive the mounting post, wherein the fixture is configured to pivot about the mounting post, wherein the fixture includes first and second cancellation fingers extending from the first and second arms, respectively, for contacting a cancellation member depending from a steering wheel of a motor vehicle.

26. The system of claim 25, wherein the first and second cancellation fingers are pivotally mounted to the first and second arms of the fixture, respectively.

27. The system of claim 25, wherein the fixture includes an upper surface facing the turn signal cancellation member and an opposite lower surface, the upper surface having a first cam profile formed therein about the bore, wherein the turn signal cancellation member includes a lower surface facing the fixture and an opposite upper surface, the lower surface having a second cam profile formed therein about the bore, wherein the first and second cam profiles having mating configurations and interconnect the turn signal cancellation device and the fixture, providing for synchronized pivotal movement of the fixture and the cancellation device, and providing for pivotal movement of the fixture relative to the cancellation device above a threshold torque applied to the first and second cancellation fingers of the fixture by the cancelling member.

* * * * *